(12) United States Patent
Oosthoek et al.

(10) Patent No.: US 12,201,226 B2
(45) Date of Patent: Jan. 21, 2025

(54) RETAIL SHELF FLOOR DIVIDER

(71) Applicant: VusionGroup GmbH, Fernitz-Mellach (AT)

(72) Inventors: Jan Oosthoek, Voitsberg (AT); Philipp Jauck, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 531 days.

(21) Appl. No.: 17/422,181

(22) PCT Filed: Jan. 12, 2019

(86) PCT No.: PCT/EP2019/050723
§ 371 (c)(1),
(2) Date: Jul. 10, 2021

(87) PCT Pub. No.: WO2020/143924
PCT Pub. Date: Jul. 16, 2020

(65) Prior Publication Data
US 2022/0117414 A1    Apr. 21, 2022

(51) Int. Cl.
*A47F 10/02*    (2006.01)
*A47F 5/00*    (2006.01)
(Continued)

(52) U.S. Cl.
CPC .............. *A47F 10/02* (2013.01); *A47F 5/005* (2013.01); *G06Q 20/203* (2013.01);
(Continued)

(58) Field of Classification Search
CPC .... A47F 10/02; A47F 5/005; A47F 2010/025; G06Q 20/203; G06Q 30/0201; G06Q 30/06; G07F 9/026; G07G 1/0054
(Continued)

(56) References Cited

U.S. PATENT DOCUMENTS

| | | | |
|---|---|---|---|
| 2011/0143779 A1* | 6/2011 | Rowe | H04M 3/42348 455/456.3 |
| 2016/0048798 A1 | 2/2016 | Meyer | |
| 2016/0132822 A1* | 5/2016 | Swafford | H04W 4/80 705/28 |

FOREIGN PATENT DOCUMENTS

| | | |
|---|---|---|
| DE | 202014004232 U1 | 8/2015 |
| WO | 96/31833 A1 | 10/1996 |
| WO | 2017/106764 A1 | 6/2017 |

OTHER PUBLICATIONS

International Search Report published Jul. 16, 2020 WO 2020143924 for the parent of the present application.
(Continued)

*Primary Examiner* — Elmito Breval
*Assistant Examiner* — Hana S Featherly
(74) *Attorney, Agent, or Firm* — Studebaker & Brackett PC

(57) ABSTRACT

A retail shelf floor divider or shelf floor limiter, which comprises mechanical coupling means which are arranged for coupling the retail shelf floor divider or shelf floor limiter to a further structure, in particular a shelf floor in order to divide the shelf floor in shelf floor sections or to limit it, and electronic detection means for the detection of movement in the neighborhood of the retail shelf floor divider or the shelf floor limiter, which are arranged to utilize an electromagnetic wave, preferred a radio wave, more preferred a light wave, or a sound wave for said detection.

20 Claims, 3 Drawing Sheets

(51) Int. Cl.
    *G06Q 20/20*      (2012.01)
    *G06Q 30/0201*    (2023.01)
    *G06Q 30/06*      (2023.01)
    *G07F 9/02*       (2006.01)
    *G07G 1/00*       (2006.01)
(52) U.S. Cl.
    CPC ......... *G06Q 30/0201* (2013.01); *G06Q 30/06*
        (2013.01); *G07F 9/026* (2013.01); *G07G*
        *1/0054* (2013.01); *A47F 2010/025* (2013.01)
(58) Field of Classification Search
    USPC ....................................................... 362/133
    See application file for complete search history.

(56) References Cited

OTHER PUBLICATIONS

An Office Action mailed by the Korean Intellectual Property Office on Apr. 8, 2024, which corresponds to Korean Patent Application No. 10-2021-7022920 and is related to U.S. Appl. No. 17/422,181; with English language translation.

An Examination Report mailed by the Australian Patent Office on Jul. 31, 2024, which corresponds to Australian Patent Application 2019421719 and is related to U.S. Appl. No. 17/422,181.

\* cited by examiner

RETAIL SHELF FLOOR DIVIDER

TECHNICAL FIELD

The invention relates to a retail shelf floor divider.

BACKGROUND

For example, a known retail shelf floor divider is disclosed in U.S. D831,394S. It is typically made from plastic and has the shape of an elongated plate. One of its ends shows mechanical coupling means which are coupled with corresponding coupling means of a shelf rail so that the shelf floor divider can be attached thereto. Placed at a certain positioned along the shelf floor, the shelf floor divider separates/divides the shelf floor in a section on its left and right side. This allows the presentation of objects (goods) of different types on the respective side of the shelf floor divider.

Unfortunately, such a retail shelf floor divider is an entirely passive element of the shelf structure. Hence, it cannot be integrated into an automated merchandize, enterprise resource planning, or stock (management) system.

The object of the invention is to provide a device that is capable to be integrated in such automated systems.

SUMMARY OF THE INVENTION

This object is achieved by a system according to claim 1. Therefore, the subject matter of the invention is a retail shelf floor divider or shelf floor limiter, which comprises mechanical coupling means which are arranged for coupling the retail shelf floor divider to a further structure, in particular a shelf floor, in order to divide the shelf floor in shelf floor sections or to limit it, and electronic detection means for detection of movement in the neighborhood of the shelf floor divider or shelf floor limiter, which are arranged to utilize an electromagnetic wave, preferred a radio wave, more preferred a light wave, or a sound wave for said detection.

The object is also achieved according to claim 11. Therefore, the subject matter of the invention is a merchandizing system, which comprises a shelf floor to present at least one object on it, and at least one retail shelf floor divider or shelf floor limiter according to the invention, wherein the retail shelf floor divider or shelf floor limiter is mechanically coupled to a further structure, in particular the shelf floor, by its mechanical coupling means in order to divide the shelf floor in shelf floor sections or to limit it.

The measures according to the invention provide the advantage that the shelf floor divider or the shelf floor limiter itself becomes an electronical device to automatically perform the detection of movement on the shelf floor or to form the basis for the automatic detection of movement on the shelf floor by another electronic device, which is coupled with the shelf floor divider or the shelf floor limiter. This opens up a number of use cases which were up to now not possible with conventional (passive) shelf floor dividers and which will be explained in further discussions of the invention.

Said shelf floor limiter limits the outer boundaries of the shelf floor. This may by a shelf rail attached to the front edge of the shelf floor or a limiting structure attached to the right or left edge of the shelf floor. The shelf floor limiter might also be realized by the shelf rear wall. But also, an electronic shelf label that is attached to the front edge of the shelf floor or to the mentioned shelf rail may realize the shelf floor limiter. In case of the electronic shelf label the wave, preferred the light wave, is emitted from the rear wall of the electronic shelf label into the space behind the electronic shelf label in order to detect movement on the shelf floor.

Further particularly advantageous embodiments and extensions of the invention arise from the dependent claims and the following description. It should be noted that certain features of a claim category can be transferred with appropriate adaptation to the other categories and achieve the same effects there. Furthermore, it should be understood that the use of the phrase " . . . arranged to . . . " shall be understood to introduce a mechanical, structural, or a certain technical feature, a technical feature formulated in a functional way, or also a technical design, e.g. realized by means of computer or electronics hardware, or even a software based feature in the context of a computer implemented invention, which is based on a program code that is executed on a programmable computer hardware in order to achieve a certain function or effect.

The electronic detection means may be arranged to detect movement along the length extension of the shelf floor divider or the shelf floor limiter. This means that the arrangement is such that movement is detectable for an object that is located along the longitudinal extension of the shelf floor divider or shelf floor limiter, or in other words on either side of the shelf floor divider or shelf floor limiter.

For reasons of clarity, the following text omits the separate mention of the shelf floor divider and the shelf floor limiter. Nevertheless, the aspects mentioned in connection with the shelf floor divider apply in the same manner also to the shelf floor limiter.

If the shelf floor divider is installed on a shelf floor to divide it in two sections such objects may be placed on the shelf floor on either side of the shelf floor divider and their movement is detectable. Further to this, also the insertion of a hand of a customer, who intends to touch or to pick goods from the shelf floor is detectable. However, the electronical detection means may also be arranged to detect movement in front of the narrow front side of the shelf floor divider. This means that the arrangement is such that movement is detectable for an object located in front of the narrow front side of the shelf floor divider. This narrow front side faces the aisle in front of the shelf on which the shelf floor divider is installed.

The mechanical coupling may be realized either by directly coupling the retail shelf floor divider to the respective shelf floor or by indirectly coupling it to the respective shelf floor. The indirect coupling may be achieved via a shelf rail to which the divider is directly coupled, wherein the shelf rail by itself is directly couple to the shelf floor. The indirect coupling may also be achieved via an electronic shelf label to which the retail shelf floor divider is directly coupled. The electronic shelf label may be directly couple to the shelf floor or indirectly coupled thereto via a shelf rail to which it is directly coupled.

In this context, the aforementioned further structure is either the shelf floor, the shelf rail or the electronic shelf label.

Further to this the mechanical coupling means may allow a Positioning of the retail shelf floor divider on discrete positions or, even more preferred, at arbitrary positions along the element to which the retail shelf floor divider is attached. In both embodiments the mechanical coupling means may also comprise electronical coupling means as will be elaborated in detail later on.

The invention can basically be relied on using an electromagnetic wave or a sound wave. As the electromagnetic wave, radio waves as well as light waves can be used, in particular in the visible or non-visible range, and particularly preferably monochromatic light is used. In the following, the invention will be discussed with reference to light, wherein the statements made in this context apply analogously also to the other types of waves mentioned above.

Finally, for the sake of compactness instead of shelf floor divider the term shelf divider is used.

In principle it would be possible to distribute the electronical detection means over a number of different shelf dividers which are than located side by side with a certain distance in-between along a shelf floor. Such an arrangement, however, would require a complex cabling and/or communication process between the electronics of the electrical detection means installed on each retail shelf divider and a separately located controller, which is arranged to process raw signals received from the different electrical detection means in order to come to a decision if movement took place or not. In order to overcome this drawback, it would also be possible to provide each retail shelf divider with a central controller device at which all signals, which are supplied by the electronics of the number of electronic detection means of this shelf divider are collected and processed in order to determine if a movement of an object happened. However, it is of particular advantage that the electronic detection means further comprise a transmitting unit for transmitting a light or sound wave, and a receiving unit for receiving a light or sound wave, and a movement detecting unit, which is arranged to detect a change of a physical parameter related to a light or sound wave, which was sent out by the transmitting unit and received by the receiving unit after its reflection from an object. This means that the entire electronics, which is required to detect movement, is installed in (e.g. integrated into or embedded into, respectively, and/or attached onto) each electronic detection means of the retail shelf divider. In fact, each individual electronic detection means is arranged to independently/autonomously detect movement for itself.

On the one hand, as far as light waves are considered, the physical parameter used to discriminate between no movement and movement may e.g. be brightness or color tone, in particular a change of these properties detected within a time interval or within a number of measurements. This embodiment may be realized by the use of a photoelectric sensor, which processes the light reflected from the object.

On the other hand, as far as sound waves are considered, the physical parameter used to discriminate between no movement and movement may e.g. be sound intensity (volume) or frequency (sound), in particular a change of these properties detected within a time interval or within a number of measurements. This embodiment may be realized by a micro Electro Mechanical System (MEMS), which processes sound waves reflected from the object.

Preferably, movement detection will be based on a measured change of the physical parameter, which, exceeds a certain threshold.

However, in the preferred embodiment the movement detection unit is arranged to measure a flight-of-time (or time-of-flight) for a light wave or sound wave emitted by said transmitting unit of the electrical detection means and collected by said receiving unit after reflection from said object and detect as a change of said physical parameter a change of the measured flight-of-time. Therefore, the influence of disturbing signals from the environment can be reliably suppressed.

Further to this the used light wave or sound wave may also transport information coded into it so to ease its discrimination from environment influences.

In this context it is of particular advantage that the transmission unit is arranged to send out laser light (a laser light beam) and the receiving unit is arranged to collect said laser light (laser light beam).

For example, an integrated electronic device, that is feasible to be used to realize the invention is available under the product code VL53L0X supplied by STMicroelectronics (which is a registered name).

The shelf divider according to the invention may comprise only one single electronic detection means located at a defined position along the length of the shelf divider. This single electronic detection means may be arranged to detect movement on both sides of the shelf divider. However, according to a more preferred embodiment the shelf divider further comprises at least two electronic detection means which are located at different positions along the length of the retail shelf divider. This allows to detect movement at different locations on the shelf floor, in particular along its depth or in other words along the length extension of the retail shelf divider. Hence a more precise detection with regard to the location where movement took place is given. In practice the number of electronic detection means may be any number between two and e.g. three or even up to ten or higher. The number of electronic detection means may depend on the parameters of the electronical detection means, e.g., like spatial detection boundaries or ranges, but also on the depth of the shelf floor or also on the typical number of goods on the shelf, so that a proper information regarding movement can be supplied by the electronic detection means.

Furthermore, it may be of advantage that the at least two electronic detection means which are arranged along the length of the retail shelf divider show an alternating orientation with regard to their detection orientation so that movement is detectable on both sides (left/right side) of the retail shelf divider. This embodiment is of particular advantage if two or more shelf dividers are used along the length of the shelf floor. In particular, the position of the electronic detection means can be chosen such that electronic detection means installed on two different shelf dividers but having an orientation to detect movement in the space between the two electronic shelf dividers do not disturbed each other.

Once movement was detected, it is of importance to further process this information. Therefore, the electronic detection means are arranged to generate and submit a detection signal upon movement-detection. Furthermore, the retail shelf divider further comprises electric connections to supply power to the electronic detection means and/or to transmit said detection signal, so that the detection signal can be processed by another device.

The electric connections may be split into a separate power supply connection and a separate detection signal connection, so to say different wires are used for power supply and the detection signal. However, in a preferred embodiment a low wire number bus system is used to transport the detection signal. This may be achieved by a so termed I²C (I-Square-C, sometimes also termed TWI (Two-Wire-Interface) interface. This reduces the wiring complexity to the absolute minimum, in particular if two or more electronic detection means are installed along a single shelf divider. Here, the data communication interfaces of the individual electronic detection means are connected to the I²C bus, one of the electronic communication means is assigned a master role while the other are operated in slave mode.

The detection signal may comprise a unique identification code to identify the respective electronic detection means that released the detection signal. This unique identification code may be used to simply identify the respective electronic detection means and in turn to clarify where movement was detected, because the position of the respective electronic detection means is known. In a more complex environment, in which a number of more than one of these electronic detection means are installed at well-known positions, the collection and Processing of the individual detection signals released from the individual electronic detection means makes it possible to derive information related to e.g. the trajectory of an object or the direction of movement or the type of movement (for example, an object was placed on a shelf floor, or picked from a shelf floor, or picked from an shelf floor and returned on the shelf floor) and the like.

As mentioned, in addition to the electronic detection means, the retail shelf divider may comprise a processing unit to process the detection signal(s) directly by itself and thereafter releases some meta information describing the processing result for further processing at a different location outside of the shelf divider. However, the detection signal(s) may also be supplied directly to a further device which processed the received detection signal(s).

In this context it is of particular advantage that the electrical connections comprise connectors which are integrated into the mechanical coupling means. This eases the installation of the shelf divider dramatically. By means of simple coupling the mechanical coupling means of the shelf divider with corresponding coupling means of the shelf floor or the shelf rail also the electronic detection means are coupled to an electronic bus system arranged in the shelf.

According to a particular embodiment, the shelf divider further comprises an electronic temperature sensor, preferably at one of its ends or end areas, which is that end or end area that is the furthest away from an outwardly facing front edge of a shelf floor, if the retail shelf divider is coupled as intended with said shelf floor. The temperature sensor allows to monitor the environment temperature of goods displayed on the shelf, which may be important if temperature sensitive goods are placed on the respective shelf floor. It enables to track temperature over time and to detect possible hot spots (on the shelf floor or in its proximity). This could be used to optimize product placement which is sensitive to heat with regards to expiration or loss of quality. It also allows to trigger an alarm if a threshold temperature is exceeded. Basically, the electronic temperature sensor can be located at any position along the shelf divider. However, the front side or area of the retail shelf divider is easily influenced by the electronic equipment, like an electronic shelf label (e.g. a video-rail) and also by the people moving, breathing, etc. Therefore, its positioning on the rear end of the retail shelf divider can be of advantage if these influencing effects shall be omitted. On the other hand, the position close to the front side may also be of advantage, if such mentioned influencing effects shall in particular be detected. The processing of a temperature signal or alarm signal generated by the temperature sensor can be performed similar as for the electronic detection means. In particular identical electronic connections and wiring-arrangement can be used for signal transmission or signal communication.

Further to this, there might also be more than one single temperature sensor. These temperature sensors may be located at different positions along the length of the retail shelf divider. They may allow to measure a temperature gradient along the retail shelf divider or a change of temperature along the shelf divider.

In order to allow a highly efficient data processing of sensor data, the electronic temperature sensor is electrically coupled with the electrical connections which are used for the electronic detection means.

The merchandizing system that comprises a shelf divider as discussed above may also comprise an electronic shelf label, which is attached to the shelf floor, preferably at a front edge of the shelf floor (so to realize the shelf rail by itself), and which is arranged to display information, preferably information related to the object presented on the shelf floor, by the aid of its display device. Such an electronic shelf label is for example known from the published international patent application, filed with application number PCT/EP2014/053376 on 20 Feb. 2014. It discloses on pages 2-22, which are herewith incorporated by reference, amongst other features an electronic shelf label (indicated there as "radio tag"; in the original German text "Funk-Tag") that is battery powered and comprises a very low power consuming display technology for the display of static information (still images). However, such an electronic shelf label is also known from the international patent application, filed with application number PCT/EP2017/078844 on 10 Nov. 2017. It discloses on pages 2-8, which are herewith incorporated by reference, amongst other features an electronic shelf label (indicated there as "playback device") which comprises a video display for the display of moving images. This type of electronic shelf label is powered by a separate power supply.

In order to process the detection signal generated by the electronic detection means, it is of advantage that the electronic shelf label comprises an interface, preferably a wire-based interface, which is arranged to receive a detection signal from the electronic detection means of the electronic retail shelf divider. Given the two distinct types of embodiments of the electronic shelf label, different methods of acquiring the detection signal may be implemented.

In case of the battery powered electronic shelf label, which is most of its lifetime operated in an ultra-low power consuming sleep state, the electronic detection means may be arranged to store the detection signal, preferably together with a time stamp, and the electronic shelf label may be arranged to check the electronic detection means each time it goes into its active state.

In case of an electronic shelf label that is (permanently) powered by a power supply and therefore mainly operated in an active state, the electronic detection means may trigger the acquisition of the detection signal by means of a command sent to the electronic shelf label or by means of an interrupt signal. According to a further embodiment the electronic shelf label may poll the electronic detection means to submit the detection signal, if available at all. Here the detection signal takes on the meaning of a status information indicating the existence of a movement detection. To be complete, it should be mentioned that the detection signal can be acquired by a push or pull method.

In order to make the detection signal available it is of advantage that the electronic shelf label comprises an interface, preferably a wire-based interface, which is arranged to receive a detection signal from the electronic detection means of the electronic retail shelf divider. This allows a simple and direct communication between the electronic shelf label and the electronic detection means (optionally also the electronic temperature sensor) by avoidance of any server involvement. In particular this feature allows the autonomous processing of movement detection directly "within" a shelf because the position of a shelf divider is typically correlated (in the proximity) of the position of an electronic shelf label.

Regarding the further processing of the detection signal it is of particular advantage that the electronic shelf label is arranged to perform an operation as a consequence of receiving the detection signal. Such an operation may be a communication trigger to communicate with a retail store management server for reporting the occurrence of a movement.

However, in a preferred embodiment the operation is the start of the display of information by its display device or the change of information displayed by its display device. This is of particular importance for the time-critical presentation of information that is related to the products displayed at the position of the shelf, where the movement detection took place. Such a time-critical information may be displayed only if a customer moved a product on a shelf floor (e.g. picked the product from the shelf floor). In this particular moment the information displayed so far by the electronic shelf display is changed to present further, e.g. more particular information. This may be an information about a discount program. In case of a video display enabled electronic shelf label, this may be the playback of a particular promotion video or the like.

The features of the invention may be realized by means of pure hardware or of programmable hardware on which a software is executed, e.g. microprocessors, microcontrollers or application specific circuits with memory devices to store the software and/or operational data are to be considered.

Finally, it is to mention that communication between the electronic shelf label(s) and the individual electronic detection means or other devices integrated into the shelf divider may also be implemented by wireless technology. Furthermore, it is not necessary to have a shelf rail to which the shelf divider is mechanically coupled because the shelf divider can be coupled directly to the shelf, the shelf floor or directly to the electronic shelf label, provided that the electronic shelf label comprises matching mechanical coupling means. This is of particular advantage if the electronic shelf label itself realizes the shelf rail.

According to a further aspect of the invention the divider or the limiter (in particular on its front that faces outwards from the shelf) or even the electronic shelf label may be equipped with a very small camera. Such a camera may for example be integrated into the housing, preferably the front wall, of an electronic shelf label or a video rail electronic shelf label. The camera is directed towards the area in front of the respective shelf. If an image of a person is taken, it does not store the image and consequently no personal data are stored at all. Preferably, the image is immediately analyzed, and certain behavioral properties of the person are identified and supplied to a further processing unit in digital form, preferably as anonymized meta data. Such a further processing unit may be the one installed in the electronic shelf label or a separate computer or server.

The behavioral properties describe in a digital representation:
that a person picks objects on a shelf floor at all.
that a person picks objects on the shelf floor and does not put it back.
that a person picks objects on the shelf floor and puts it back on the shelf floor.
that a person stops in front of the shelf.
that a person comes closer to the shelf and rests in front of it.
what kind of facial expression the face of a person shows.
what changes of movement a person makes.
and so forth.

All of this can be brought into context with the movement detection on the shelf floor as explained earlier so to link the customers behavior with the products concerned or to further finetune the data acquired for a particular shelf floor or product. All of this can also be brought into context with the video or still image just shown on the electronic shelf label or brought into context with changes of the video or still image which may be triggered by approach of a person in front of the shelf.

In summary, the data collection created, in particular the conclusions drawn from analyses of these data may help the operator of a shop to further optimize the promotion of products including the finetuning of the content displayed on the electronic shelf labels so to increase sales numbers.

However, it is to mention that the installation of the camera onto the or in the mentioned devices or objects can be independent from the aspects of movement detection on the shelf floor. Hence, divider, limiter or the electronic shelf label may be equipped only with the camera and no means for movement detection may be foreseen. The behavioral data derived by the camera are than supplied to the further processing unit where they are analyzed without being brought into context with movement detection.

The further processing unit may be a management device for managing a number of shelfs, which may be installed at one of the shelfs or close to a group of shelfs. But also, a retail shop management server or the like may receive the anonymized meta data for further processing.

Further to this, this specification also discloses a system for generating a three-dimensional map of a shelf floor. Such a system comprises a number of shelf floor dividers which are located on a shelf floor and the shelf floor may be limited at its outer edges with a number of shelf floor limiters of which the one located on the front edge of the shelf floor may be realized as a shelf rail or an electronic shelf label as explained earlier in this specification.

The coupling onto the shelf floor may be achieved according to the explanations provided earlier in this specification.

Here, the electronic detection means are realized similar to the earlier explanations in this specification but with the difference that they are not arranged or used to detect movement. In fact, they are used to measure distances to other objects, which may be the distance between neighboring shelf floor dividers or between shelf floor limiters and neighboring shelf floor dividers or the distance to other objects like goods placed on the shelf floor. Similar to the electronic detection means which are arranged to detect movement also in this embodiment the flight-of-time measurement is used to measure distances.

The collection of measured distances is provided (by wires or radio signals) to a central processing unit, which may be a dedicated controller (e.g. microcontroller installed in the shelf or in one of the electronic shelf labels or even in one of the dividers or limiters) or a separate computer or server. Such a central processing unit knows the exact position of at least one of the dividers or limiters involved in the generation of the collection of distance measurements and generates therefrom the three-dimensional map of the shelf floor including the position of other dividers or limiters or even the position of further objects placed on the shelf. This may be performed for all of the shelf floors, such that the final result is a precise planogram of the shelfs including the exact position of shelf floor dividers and/or limiters in a shop, in particular also including positioning information related to objects placed on the shelf floors. If this type of planogram is repeatedly updated (for the entire shop or only for a part or a shelf or even only one particular shelf floor) it allows to deduce movement of objects on the shelf floor, which may be the frequency users/customers/employees touch and/or reposition certain objects and the like. Also, rapidly selling objects, objects running out of stock or objects being refilled on a shelf can be detected.

Finally, it is mentioned that in a further embodiment the electronic detection means are used for movement detection and also distance measurement.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figure 1:
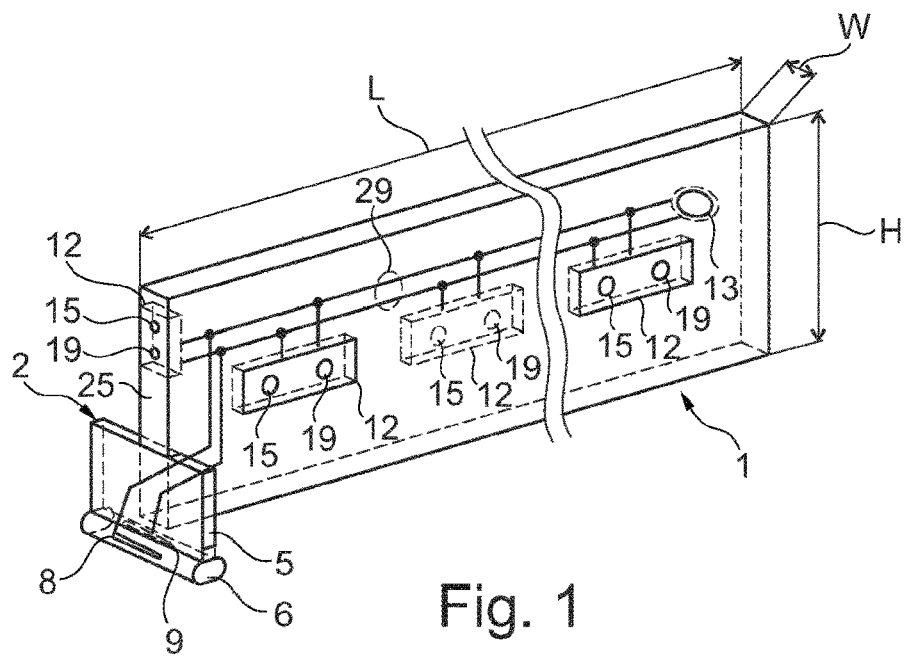
FIG. 1 a retail shelf divider according to the invention.

FIG. 1 shows a retail shelf divider 1, in the following abbreviated divider 1. The divider 1 has a certain longitudinal extension (length) L of approximately 50 cm. Its length, however, may vary dependent on the depth of a shelf floor 3 (see e.g. FIG. 5) on which it is intended to be used. Further to this the divider 1 has a front side 25 with a certain width W, e.g. in the present case of approximately 4 mm, and a certain height H, e.g. in the present case of approximately 4 cm. The body of the divider 1 is made of plastic.

At its left side end on its bottom it comprises mechanical coupling means 2. They are arranged for coupling the divider 1 to a shelf floor 3 in order to divide the shelf floor 3 in shelf floor sections (see FIG. 5). The coupling can be such that the divider 1 is directly coupled to the shelf floor 3 or via a shelf rail 4, to which it is directly coupled (see e.g. FIG. 2). The mechanical coupling means 2 show the form of a relatively small and flat stripe 5 which extends perpendicular to the length extension L of the divider 1. The mechanical coupling means 2 show a rod-like part 6 at its bottom, which is arranged to fit into a corresponding groove-like depression 7 in the shelf rail 4 (see FIG. 2). The mechanical coupling means 2 further comprise electrical contact pads 8, 9 which are positioned to contact corresponding electrical contact elements 10, 11 of the shelf rail 4. The electrical contact elements 10 and 11 run along the entire length of the groove-like depression 7, so that the divider 1 can be located at an arbitrary position along the shelf floor 3. The electrical contact pads 8, 9 may also comprise a spring-like support which improves the mechanical and/or electrical contact with the electrical contact elements 10, 11. The electrical connection system for the electrical connection of the divider 1 with the shelf rail 4 may be realized either by a two-wire connection-system (as depicted in the FIG. 2) or may be a multi-wire connection-system (not shown in the Figures).

Focusing now back on FIG. 1, the divider 1 further comprises electronic detection means 12 for the detection of movement in the neighborhood of the divider 1. FIG. 1 shows four of these detection means 12, wherein the first one is located at the narrow front side 25 and the others are located at different positions along the length L of the divider 1. Those who are positioned along the length L of the divider 1 show an alternation orientation with regard to their detection direction. The distance between these neighboring electronic detection means 12 is chosen such that they do not interfere each other during operation.

The divider 1 further comprises a temperature sensor 13 which is located on the divider 1 at the opposing end/end section with regard to the mechanical coupling means 2.

The electronical detection means 12 and the temperature sensor 13 are connected by means of a wiring-arrangement 29 to the electrical contact pads 8, 9. The wiring-arrangement 29 may be embedded into/within the body of the divider 1 or it may be attached or glued or printed on the surface of the divider 1.

Figure 2:
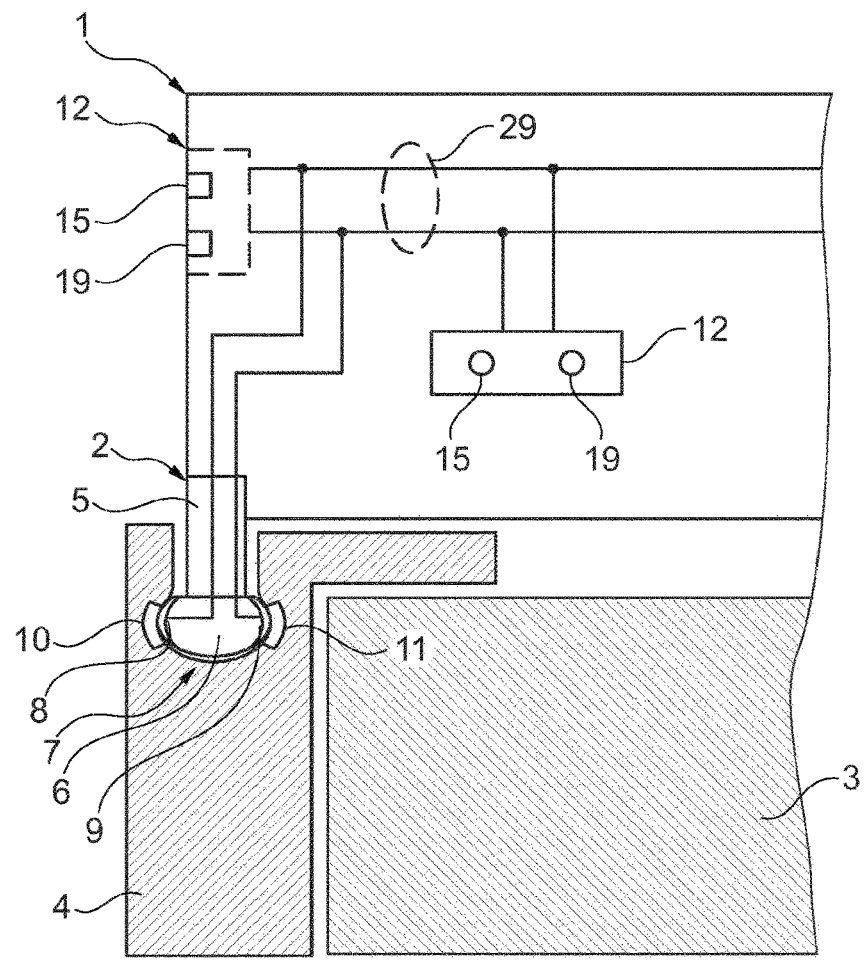
FIG. 2 the retail shelf divider coupled to a shelf rail.

FIG. 2 shows the interaction of the mechanical coupling means 2 with the shelf rail 4 that is attached to a shelf floor 3. In this view cutting planes of the shelf rail 4 and the shelf floor 3 are visible.

Figure 3:
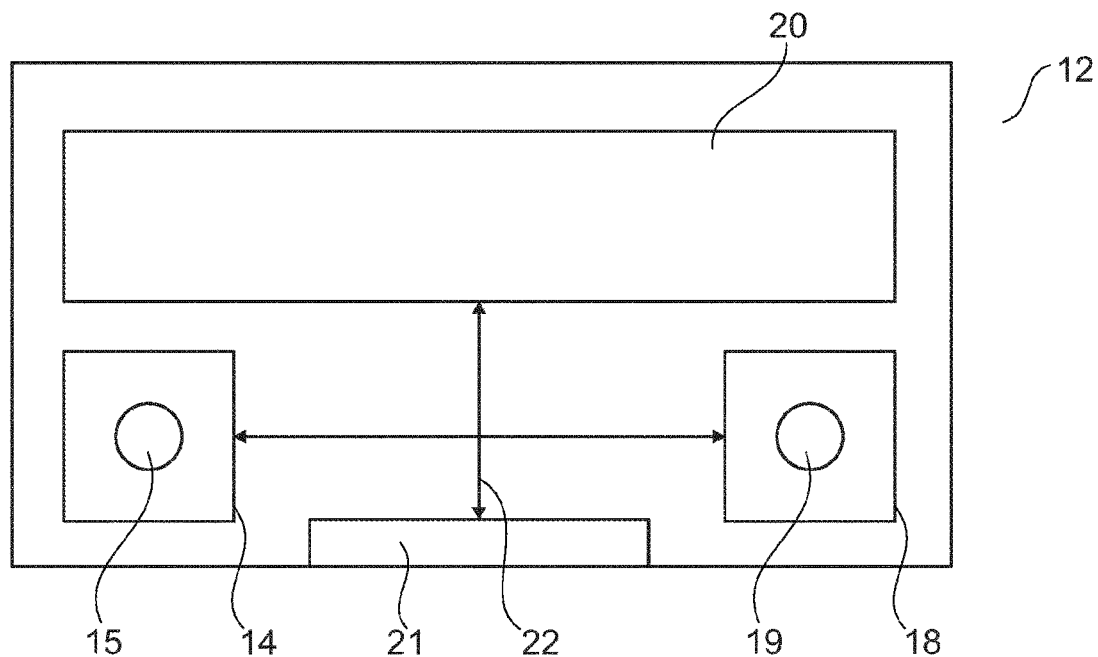
FIG. 3 a block diagram, of the electronics of the retail shelf divider.

FIG. 3 shows a block diagram of the electronic detection means 12. The electronic detection means 12 comprise a transmitter unit 14, which comprises the electronics (not shown in detail) and transmitter optics 15 to generate and send out a laser light beam 16 (see FIG. 4), wherein the transmitter optics 15 has a certain transmission beam cone opening angel A of approximately 35° in the present case. Further to this, the electronic detection means 12 comprise a receiving unit 18, which comprises the electronics (not shown in detail) and receiving optics 19 to receive the laser light beam 16 (see FIG. 4), wherein the receiving optics 19 has a certain reception beam cone opening angel B of approximately 25° in the present case.

Figure 4:
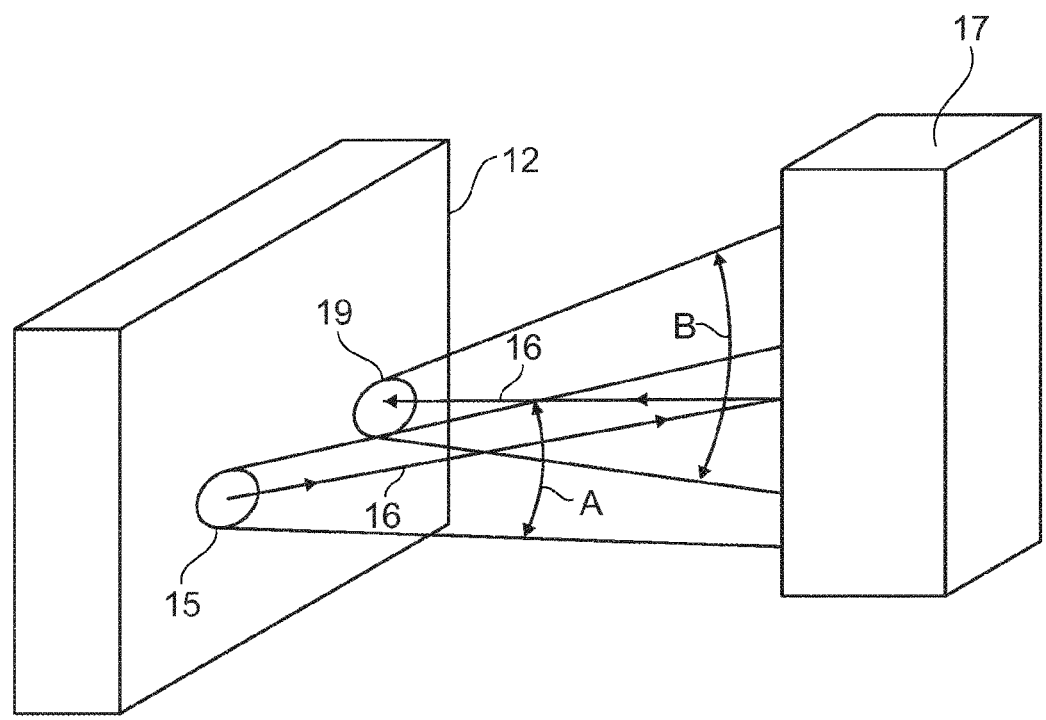
FIG. 4 a laser light beam that is emitted by the retail shelf divider and received by the retail shelf divider after its reflection on an object.

The electrical detection means 12 further comprise a movement detection unit 20, which measures flight-of-time for the laser light beam 16 between the emission and the reception after being reflected on an object 17 as visualized in FIG. 4. Movement detection is finally performed by detecting a change in the measured flight-of-time, wherein the change exceeds a predefined or adaptively adjustable threshold value. As a result, a detection signal is generated by the movement detection unit 20.

As can be seen in FIG. 3, the electronic detection means 12 further comprise an interface 21 to connect to the wiring-arrangement 29. An internal (data/signal) bus 22 connects the units 14, 18 and 20 with the interface 21.

Figure 5:
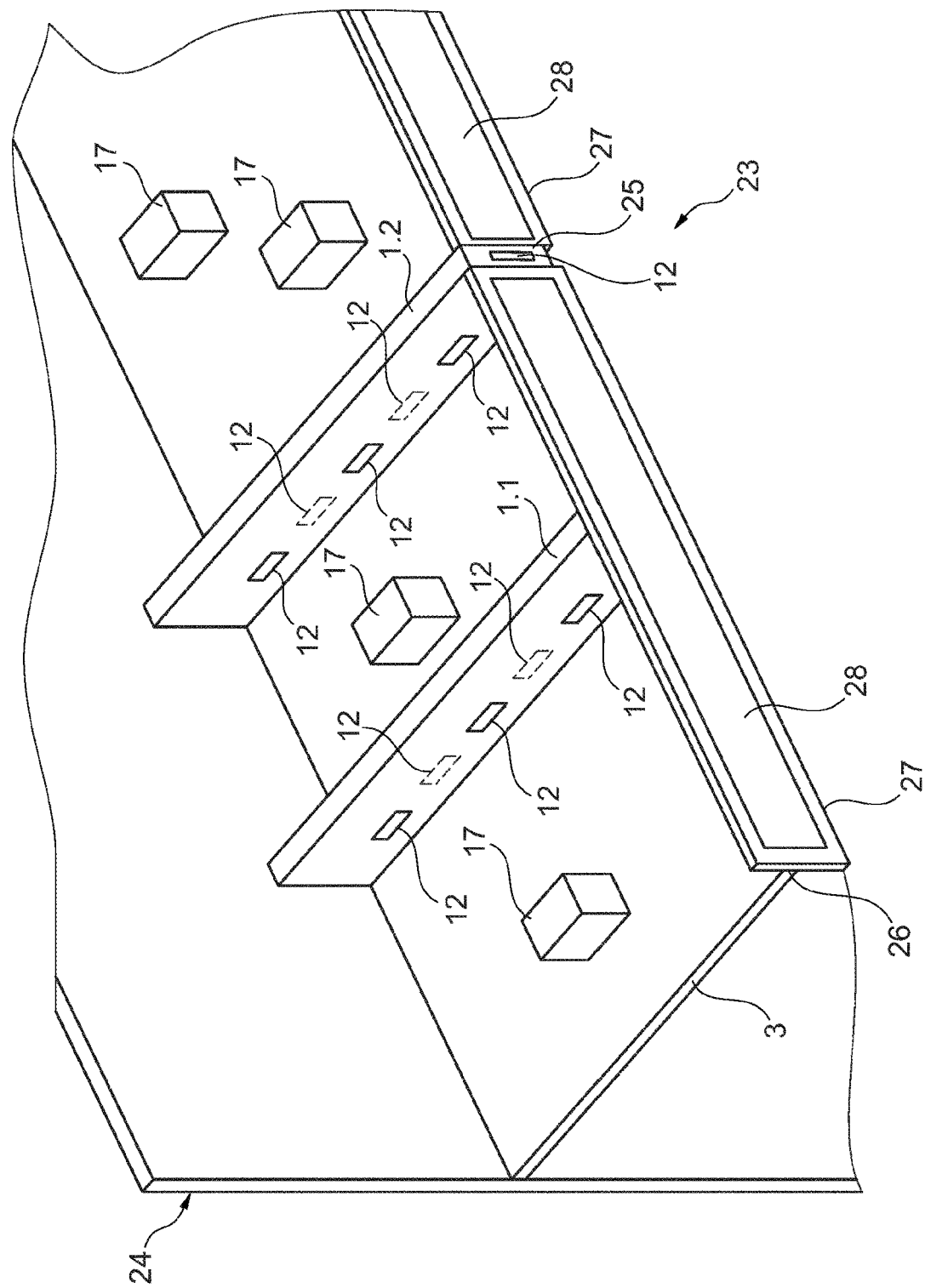
FIG. 5 the retail shelf divider installed in a merchandizing system.

FIG. 5 now shows the application of the divider 1 in a merchandizing system 23. A shelf 24 comprises a plurality of shelf floors 3 of which only one is shown. The front edge 26 of the shelf floor 3 is covered with two electronic shelf labels 27, each is equipped with a video display 28 and comprises a digital processing unit (not shown) and an content interface (not shown) to communicate with a host computer and/or with other electronic shelf labels 27 in order to receive and to playback motion or still image content by the video display 28. Hidden between the front edge 26 of the shelf floor 3 and the electronic shelf labels 27 is the shelf rail 4, to which the two dividers 1 are attached with their mechanical coupling means 2. In the following they are distinguished from each other by reference signs 1.1

(first divider) and 1.2 (second divider). Because of the scale of FIG. 4 details of the wiring arrangement 29 and the transmitter or receiving optics 15, 19 and the temperature sensor 13 are not shown.

The two dividers 1.1 and 1.2 comprise a number of electronic detection means 12, which are positioned and oriented to spot movement detection on the left or right side of the respective divider 1.1 or 1.2, so to say only on or slightly above the shelf floor 3. This allows to detect e.g. moving in or out of a user's hand, as well as inserting or removing of objects 17.

The front side 25 of the first divider 1.1 is hidden behind the left electronic shelf label 27. In this installation scenario the electronic detection means 12 of the front side 25 may be put out of operation or the first divider 1.1 may be different from the second divider 1.2, so to say without the front side 25 electronic detection means 12.

The second divider 1.2 is located/positioned between the two electronic shelf labels 27 and its front side 25 is visible between the two electronic shelf labels 27. Here the electronic detection means 12 that is installed on the front side 25 is visible. It is used to detect movement in front of the shelf 24, e.g. the movement of persons/customers in front of the shelf 24. This detection can be used, for example, to validate a detected movement on the shelf floor 3 or as a trigger to display particular video sequences or further detailed product information on neighboring electronic shelf labels 27.

In order to process the detection signal released by the individual dividers 1.1, 1.2, each electronic shelf label 27 also comprises a wire-based detection interface (not shown in the figures) that is connected to the electrical contact elements 10, 11 of the shelf rail 4 and used to receive the detection signal from the various dividers 1.1 or 1.2. In fact, only the detection signals generated by upfront registered electronic detection means 12 are received and processed by the individual electronic shelf labels 27. This upfront registration process can be performed during the installation or placement of the respective divider 1.1 and/or 1.2. The logic link between one of the movement detection means 12 and one or more of the electronic shelf label 27 may be defined by a server (not shown) that stores the planogram of the retail store, the location of the individual electronic shelf labels 27 and the individual dividers 1.1, 1.2 and so on. However, the logic link may also be defined locally by means of handheld devices (not shown) used by the staff of the retail shop. After the logic link between an electronic shelf label 27 and the individual divider 1.1 and/or 1.2 is established the respective electronic shelf label 27 processes only those detection signals which are released by the divider 1.1 or 1.2 to which it is logically linked.

In operation, the electronic shelf labels 27 show a still image having a background image and virtual shelf label, which is basically an image that shows information which is related to the particular product located on the shelf floor 3 on which the electronic shelf label 27 is installed. Once the electronic detection means 12 located on the front side 25 of the second shelf divider 1.2 detects movement of a customer (not show in FIG. 5) in front of the shelf 24, it releases the detection signal which triggers the playback of a video sequence on both of the electronic shelf labels 27. The theme of this video sequence is related to the products displayed on the shelf floor 3. The customer may be attracted by the video sequence and grasps a particular object 17 from the shelf floor 3 and takes it out of the shelf 3. Once the collection of detection signals generated by the two shelf dividers 1.1 and 1.2 during this action and received at the electronic shelf labels 27 and processed there makes it clear which object 17 was taken out of the shelf 24, the electronic shelf label 27 which displays the virtual shelf label for this particular object 17 changes its displayed content and e.g. now displays information concerning quantity discounts for this particular object 17 or in other words for particular goods.

Hence, the (intelligent) retail shelf divider 1 according to the invention used in the innovative merchandizing system 23 becomes a very powerful tool for the individual product-related display of information, which is triggered by detected movement.

In a further embodiment the mechanical coupling means 2 of the shelf rail 4, which are visualized in FIG. 2 and used to couple the shelf divider 1, may also be realized directly in the shelf floor 3. The separate shelf rail 4 can be superfluous in this configuration. This embodiment is of particular interest, if the electronic shelf label 27 itself realizes the shelf rail 4.

In a further embodiment the mechanical coupling means 2 of the shelf rail 4 according to FIG. 2 can be directly realized on the back side of the electronic shelf label 27. This embodiment is of interest, because it eases the signal transmission from the electronical detection means 12 of the divider 1 to the respective electronic shelf label 27, to which it is attached, because the detection signal can directly be received from the divider 1. Here, it can be of particular advantage if the orientation of the connection mechanism (reference sign 2 together with 7) is changed from horizontal or perpendicular with regard to the shelf floor 3 (as shown in the FIG. 1 and FIG. 2) to parallel to the shelf floor 3. In this configuration mechanical coupling means 2 shown in FIG. 2 extend not downward anymore, but face to the left. The groove like recess 7 may be arranged on the back (rear side) of the electronics shelf label 27 and extend along the width of the electronic shelf label 27 such that the divider 1 coupled therewith can be located at an arbitrary position along the width or the electronics shelf label 27.

Although the mechanical coupling means 2 were so far described to allow an arbitrary positioning of the divider along the length of the shelf floor 3, the shelf rail 4 or the electronic shelf label 27, it is to mention that one can also consider an embodiment which provides a positioning at discrete positions. In this embodiment plugs and connectors can be used to enable the mechanical coupling as well as the transmission of power or of the detection signal.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. A retail shelf floor divider or shelf floor limiter, which comprises:
    mechanical coupling means comprising a rod-like part configured to fit into a depression to couple the retail shelf floor divider or shelf floor limiter to a shelf floor, such that the retail shelf floor divider or shelf floor limiter divides the shelf floor in shelf floor sections or limits the shelf floor, and
    electronic detection means configured to detect movement in the neighborhood of the retail shelf floor divider or the shelf floor limiter, the electronic detection means being configured to utilize an electromagnetic wave or a sound wave to detect the movement.

2. The retail shelf floor divider or shelf floor limiter according to claim 1, wherein the electronic detection means further comprises:
   a transmitting unit configured to transmit the electromagnetic wave or the sound wave,
   a receiving unit configured to receive the electromagnetic wave or the sound wave, and
   a movement detecting unit, which is configured to detect a change of a physical parameter related to the electromagnetic wave or the sound wave, which was sent out by the transmitting unit and received by the receiving unit after reflection of the electromagnetic wave or the sound wave from an object.

3. The retail shelf floor divider or shelf floor limiter according to claim 2, wherein the movement detecting unit is configured to:
   measure a flight-of-time for the electromagnetic wave or the sound wave emitted by the transmitting unit of the electronic detection means and collected by the receiving unit after reflection from the object, and
   detect, as the change of the physical parameter, a change of the measured flight-of-time.

4. The retail shelf floor divider or shelf floor limiter according to claim 2, wherein the transmitting unit is configured to send out laser light and the receiving unit is configured to collect the laser light.

5. The retail shelf floor divider or shelf floor limiter according to claim 1, further comprising at least two of the electronic detection means, the at least two of the electronic detection means being located at different positions along a length of the retail shelf floor divider or shelf floor limiter.

6. The retail shelf floor divider or shelf floor limiter according to claim 5, wherein the at least two electronic detection means show an alternating orientation with regard to their detection direction such that movement is detectable on both sides of the retail shelf floor divider or shelf floor limiter.

7. The retail shelf floor divider or shelf floor limiter according to claim 1, wherein
   the electronic detection means is configured to generate and output a detection signal upon movement-detection, and wherein
   the retail shelf floor divider or shelf floor limiter further comprises electric connections to: supply power to the electronic detection means, transmit the detection signal, or supply power to the electronic detection means and transmit the detection signal.

8. The retail shelf floor divider or shelf floor limiter according to claim 7, wherein the electrical connections comprise connectors which are integrated into the mechanical coupling means.

9. The retail shelf floor divider or shelf floor limiter according to claim 8, wherein the mechanical coupling means includes electrical contact pads on an exterior surface of the rod-like part and connected to the connectors, each of the electrical contact pads being configured to contact a corresponding electrical contact element.

10. The retail shelf floor divider or shelf floor limiter according to claim 1, further comprising at least one electronic temperature sensor located at one of its ends or end areas, which is that end or end area that is farthest away from an outwardly facing front edge of the shelf floor, if the retail shelf floor divider or shelf floor limiter is coupled with the shelf floor.

11. The retail shelf floor divider or shelf floor limiter according to claim 10, wherein the electronic temperature sensor is electrically coupled with electrical connections which are used for the electronic detection means.

12. A merchandizing system, which comprises:
   the shelf floor to present at least one object on it, and
   at least one retail shelf floor divider or shelf floor limiter according to claim 1, wherein the retail shelf floor divider or shelf floor limiter is mechanically coupled to the shelf floor by its mechanical coupling means in order to divide the shelf floor in shelf floor sections or to limit the shelf floor.

13. The merchandizing system according to claim 12, which further comprises an electronic shelf label, which is:
   attached to the shelf floor at a front edge of the shelf floor, and
   configured to display information related to the object presented on the shelf floor, by the aid of a display device of the electronic shelf label.

14. The merchandizing system according to claim 13, wherein the electronic shelf label comprises a wire-based interface, which is configured to receive a detection signal from the electronic detection means of the retail shelf floor divider or shelf floor limiter.

15. The merchandizing system according to claim 14, wherein the electronic shelf label is configured to perform an operation as a consequence of receiving the detection signal.

16. The merchandizing system according to claim 15, wherein the operation is a start of displaying further information by its display device or a change of information displayed by the display device.

17. The retail shelf floor divider or shelf floor limiter according to claim 1, wherein the electronic detection means is configured to utilize the electromagnetic wave to detect the movement, the electromagnetic wave being a radio wave or a light wave.

18. The retail shelf floor divider or shelf floor limiter according to claim 1, wherein the electronic detection means is directly connected to a side surface of the retail shelf floor divider or shelf floor limiter, the side surface being substantially perpendicular to the shelf floor.

19. The retail shelf floor divider or shelf floor limiter according to claim 18, wherein the electronic detection means, which is directly connected to the side surface, further comprises:
   a transmitting unit configured to transmit the electromagnetic wave or the sound wave, and
   a receiving unit configured to receive the electromagnetic wave or the sound wave.

20. The retail shelf floor divider or shelf floor limiter according to claim 1, wherein the rod-like part is wider than a front side of the retail shelf floor divider or shelf floor limiter, and the rod-like part is positioned below the front side of the retail shelf floor divider or shelf floor limiter.

* * * * *